Figure 1:
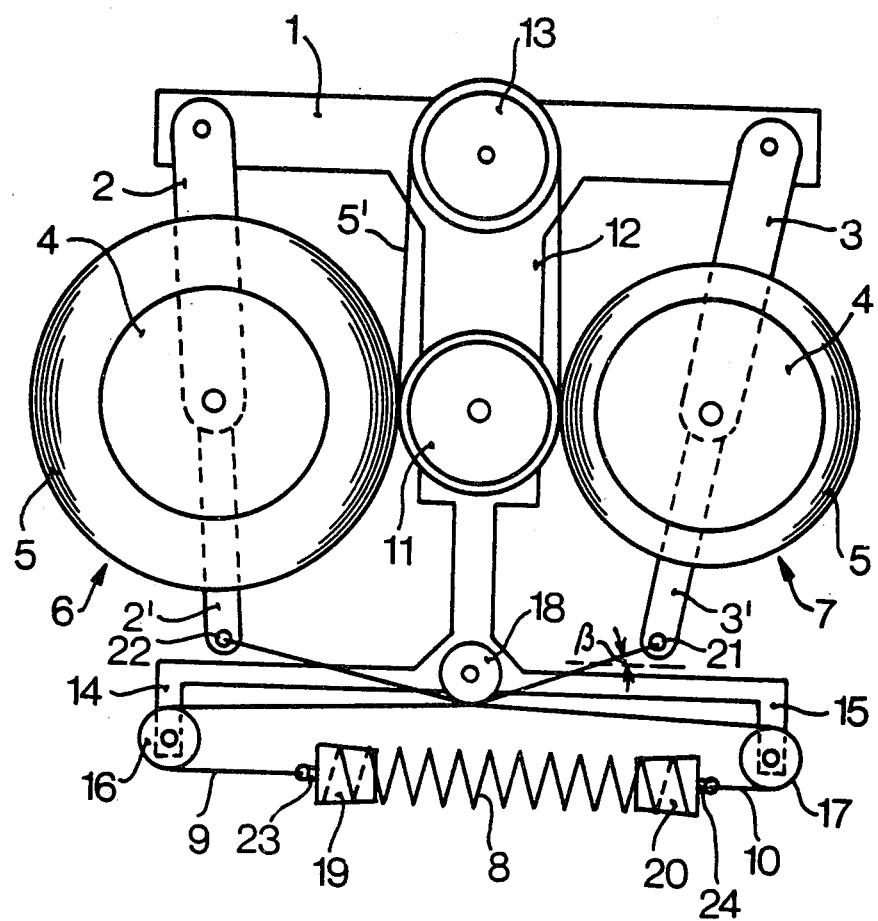

United States Patent [19]

Schoettle et al.

[11] 4,424,941

[45] Jan. 10, 1984

[54] TAPE TRANSPORT APPARATUS HAVING A CENTRAL CAPSTAN

[75] Inventors: Klaus Schoettle, Heidelberg; Joachim Flohr, Viernheim; Rolf Maerthesheimer, Worms, all of Fed. Rep. of Germany

[73] Assignee: BASF Aktiengesellschaft, Ludwigshafen, Fed. Rep. of Germany

[21] Appl. No.: 251,126

[22] Filed: Apr. 6, 1981

[51] Int. Cl.³ .................... G11B 5/008; G11B 15/32
[52] U.S. Cl. ................................. 242/192; 360/96.4
[58] Field of Search ............. 242/192, 67.5; 360/73, 360/96.3, 96.4

[56] References Cited

U.S. PATENT DOCUMENTS

| | | | |
|---|---|---|---|
| 3,593,945 | 7/1971 | Richardson et al. | 242/192 |
| 3,802,644 | 4/1974 | Maiershofer | 242/192 |
| 3,960,342 | 6/1976 | Furst | 242/192 |
| 4,023,748 | 5/1977 | Burdorf et al. | |
| 4,147,315 | 4/1979 | Kincel | 242/192 |
| 4,225,099 | 9/1980 | Schoettle et al. | |

FOREIGN PATENT DOCUMENTS

| | | |
|---|---|---|
| 1820 | 9/1980 | European Pat. Off. . |
| 2247529 | 4/1973 | Fed. Rep. of Germany . |
| 7935101 | 5/1980 | Fed. Rep. of Germany . |
| 42-850471 | 12/1967 | Japan ................................. 242/192 |

*Primary Examiner*—John M. Jillions
*Assistant Examiner*—Scott J. Haugland
*Attorney, Agent, or Firm*—Keil & Witherspoon

[57] ABSTRACT

A tape transport apparatus comprising a central drive capstan and take-up and supply reels which are rotatably mounted on supports that ae movable relative to said capstan and can be urged by biasing means toward the capstan to maintain the surface engagement between the periphery of the capstan and the peripheries of the reels. To compensate for the mass moment of inertia of the movable supports and the tape reels mounted thereon, one or more counterweighting means are provided which are movably connected to the supports in such a way that the mass inertias cancel each other out.

7 Claims, 4 Drawing Figures

TAPE TRANSPORT APPARATUS HAVING A CENTRAL CAPSTAN

The present invention relates to a tape transport apparatus comprising a central drive capstan and take-up and supply reels which are rotatably mounted on supports that are movable relative to the drive capstan, and whose peripheries can be caused to make contact with the periphery of the capstan by biasing means, as well as at least one counterweighting means, associated with the supports for the tape reels, for compensating the mass moment of inertia of the movable supports and the tape reels.

U.S. Pat. No. 4,023,748 discloses such an apparatus for transporting magnetic tape, wherein the supports for the tape reels are pivotally mounted and the reels are urged by a spring force into engagement with the drive capstan.

Tape transport apparatus of this type are sensitive to shock and vibration forces, particularly those which act in the direction in which the tape reels are pressed against the capstan. The mass inertia of the movable supports and the tape reels counteracts the impact force acting on the chassis of the tape transport, so that the tape reel situated in front of the capstan, when viewed in the direction of the impact, is urged less strongly against the capstan, and the tape reel situated behind the capstan is urged more strongly against the capstan than is the case during normal operation. Depending on the size and hence on the mass of the tape reels, pressural contact between, for example, the take-up reel and the capstan may thus be markedly reduced or even interrupted, with the result that the reel is driven at a lower speed or loses contact with the capstan, whereas, owing to the greater pressure exerted by the supply reel and in view of the capacity for elastic flow of elastomeric incompressible layers, the velocity of the unwinding section of tape increases. Consequently, the tape which is supplied at a higher rate can no longer be wound up by the take-up reel, as a result of which there is a breakdown in tape tension. The tape then usually jumps out of the tape guide, so that the tape transporting operation remains disturbed even after termination of the impact.

To remedy this, European Patent Application No. 78101257.0 proposes, in the case of a tape transport of the above-described type, that a coupling means in the form of a shock absorber comprising a piston-cylinder assembly containing a non-compressible medium, or of an electromagnetic rop/drum device should be provided between the carriers for the tape reels, it being possible for the coupling means to be arranged parallel or in series with the biasing means for the tape reel carriers. In a further, more elaborate embodiment of the prior art shock-resisting coupling means, a counterweight and a rocker assembly consisting of two blocks which rock on each other are allocated to each reel carrier, one of the rocker blocks being secured to the chassis of the tape transport, and the other rocker block to the corresponding reel carrier. The linear point of contact between the two rocking surfaces serves as the pivot point for the corresponding reel carrier, so that the pivot point, when the reel diameter is largest, i.e. when the reel has its greatest mass, is automatically moved to a point nearest the reel hub and farthest from the counterweight. Consequently, when the tape transport is subjected to shock or vibration, only slight rotational forces are imparted to the reel carriers, so that the pressural contact between the tape reels and the capstan is affected to only a very slight extent.

It is an object of the present invention to provide a tape transport apparatus of the type having a capstan to drive supply and take-up reels of tape by surface contact, with means for minimizing the effects of shock and vibration forces on the tape transport operation, which means take up very little room and hence are suitable for use in compact portable tape transports, and are simpler than the prior art devices.

We have found that this object is achieved, according to the invention, with a tape transport apparatus of the initially described type, wherein the supports for the tape reels and the counterweight(s) allocated thereto are connected together in such a way that their mass inertias cancel each other out.

In an advantageous embodiment of the tape transport apparatus of the invention, the reel supports and the counterweight(s) allocated thereto are connected together by cords guided over rolls.

In further practical embodiments, the counterweight(s) may be arranged in series or parallel with the biasing means.

In a preferred embodiment of the novel tape transport apparatus, a counterweight is allocated to each reel support and the two counterweights are connected together via the biasing means.

Owing to the simple and space-saving design of the novel means for neutralizing the effects of shock and vibration, tape transports having a central capstan and provided with such means can also be used in portable video recording/playback apparatus. The transportation of the extremely thin magnetic tapes used for storing video signals is particularly sensitive to disturbing influences. As a result of using the said novel means, the contact pressure between the tape reels and the capstan is kept within a range necessary for ensuring troublefree tape transportation, even when the tape transport is subjected to shock and vibration. These advantages are mainly due to the fact that the pivot arms serving as reel suports are provided with extensions which project beyond the hub bearings, and the counterweights for neutralizing the impact forces act on these extensions, so that by appropriate choice of the lever arm ratios with respect to the tape reels and the counterweights, the weight of the counterweights can be kept small. If, for example, a counterweight is allocated to each reel support and the length of each reel support plus extension up to the point at which the counterweight acts thereon is twice the distance between the pivot point of the support on the chassis and the center of rotation of the reel, the weight of the counterweight need only be one quarter of that of the tape reel.

Figure 3:
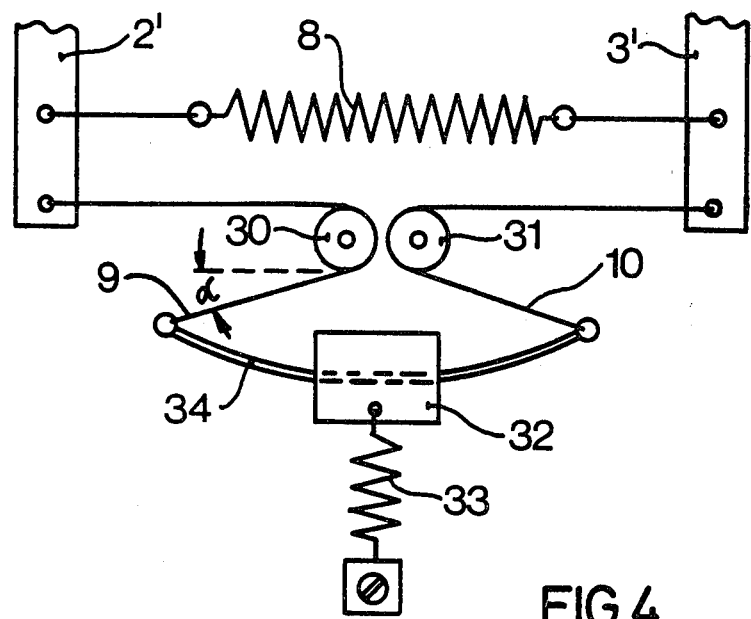
Figure 4:
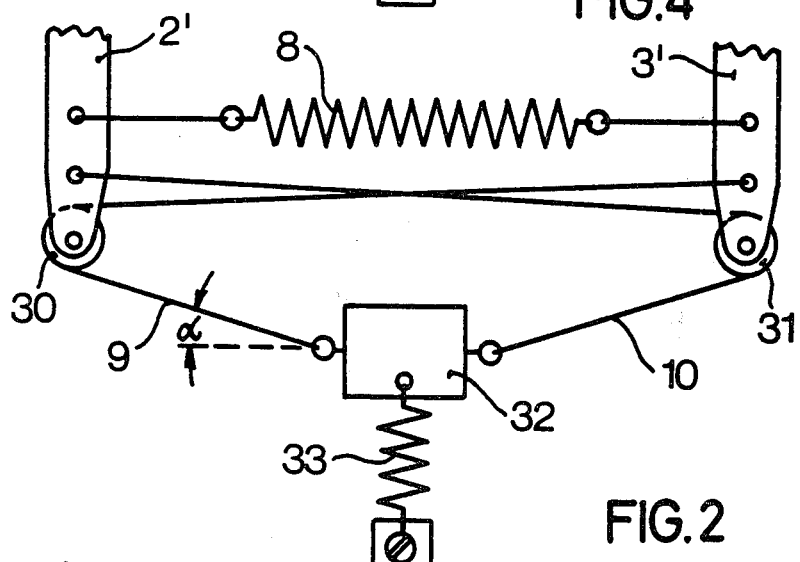
Figure 2:
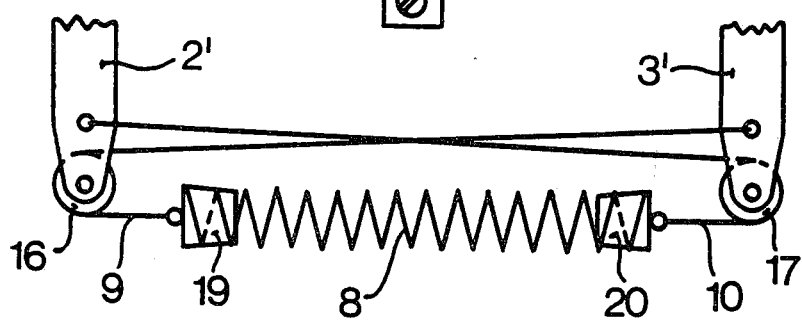

Further advantages and details of the tape transport apparatus according to the present invention are described below with reference to the embodiments illustrated in the accompanying drawings, in which FIG. 1 is a schematic plan view of the tape transport apparatus of the invention, comprising a central capstan, take-up and supply reels and counterweighting means which are arranged in series with a biasing means and are connected to the supports for the tape reels by cords guided over rolls, FIG. 2 is a schematic plan view of another embodiment of the novel means for neutralizing the effects of shock and vibration, in which the rolls are mounted on the supports, FIG. 3 is a schematic plan view of yet another embodiment of the novel means for neutralizing the effects of shock and vibration, comprising a single counterweight arranged parallel to the biasing means, and FIG. 4 is a schematic plan view of a type of means similar to that shown in FIG. 3, but in which the rolls are mounted on the supports.

FIG. 1 illustrates a tape transport apparatus constructed in accordance with one embodiment of the present invention. The apparatus is shown as having a chassis 1 bearing two pivotable supports 2 and 3 on which two tape reels 6 and 7 each consisting of a hub 4 and a tape roll 5 are journaled respectively. A spring 8 serving as biasing means draws the supports together via flexible connecting means, i.e. cords 9 and 10, so that the tape reels are urged against a central drive capstan 11 provided with a resilient peripheral portion. The cords can of course be replaced by any other type of flexible connecting means, e.g. belts. The capstan is rotatably mounted on a central portion 12 of the chassis 1, and can be driven by a motor (not shown in the drawing). The tape 5' to be transported from one reel to the other is guided over a turnaround roll 13, a loop thus being formed between the points at which the tape reels and the capstan contact one another; in the case of magnetic recording for example, at least one magnetic head, which for the sake of simplification has been omitted in the drawing, cooperates with an unsupported span of tape extending between the capstan 11 and turnaround roll 13.

To accommodate the novel device for neutralizing the effects of shock and vibration, the central portion of the chassis is provided with an extension having two symmetrically arranged arms 14 and 15, at the end of each of which a roll 16, 17 is rotatably mounted. The supports 2 and 3 are provided with extensions projecting beyond the centers of rotation of the tape reels, so that the cord 9 acting on the end of extension 3' can be guided over central roll 18 and roll 16 to counterweight 19, and the cord 10 acting on the end of extension 2' can be guided over the same central roll and roll 17 to a second counterweight 20, the two counterweights being connected together by spring 8.

An impact acting on the tape transport apparatus causes the tape reel, tending to lift off from the capstan 11 in the direction of the impact owing to the freely movable supports, and the freely movable counterweights to move in the same direction, so that the forces produced by the acceleration of the masses of the tape reels together with the supports and of the counterweights, brought about by the impact, are linked via the reversing cord connections in such a way that they counteract one another. As a result, the tape reel in question is prevented from lifting off from the capstan, whereas the force acting on the other tape reel being urged more strongly against the capstan by the impact is reduced by the accelerative force of the counterweights. For shock action of short duration the spring can to all intents and purposes be regarded as a rigid connection, so that the two counterweights 19 and 20 act on each support and hence on each tape reel. The mass of the counterweights, as shown above by way of example, depends on the mass of the supports together with the tape reels and on the ratio of the lever arm between the center of rotation of the tape reel and the pivot point of the support 2, 3 to the lever arm between the point at which the cord acts on the extension and the pivot point of the support. In addition, the angle $\beta$ at which the cord acts on the extension of the support bearing the take-up reel which tends to lift off from the capstan, must also be taken into account.

The force of spring 8 acts on tape reels 6 and 7 via counterweights 19 and 20, cords 9 and 10 and extensions 2' and 3' on supports 2 and 3.

Cords 9 and 10 are attached at one end to holes 21 and 22 in extensions 2' and 3', and at the other end to eyes 23 and 24 on the counterweights.

In an alternative embodiment as shown in FIG. 2, rolls 16 and 17 are mounted on extensions 2' and 3' of supports 2 and 3; the mode of functioning is the same as in the case of the novel means shown in FIG. 1. The combination of biasing spring 8 and counterweights 19 and 20 is particularly simple and space-saving in this embodiment and is therefore especially suitable for miniaturized tape transport apparatus.

A further embodiment in which the biasing means and counterweights are arranged parallel to one another is shown schematically in FIG. 3. Both the spring 8 and the cords 9 and 10 are fastened to the extensions 2' and 3' of the supports 2 and 3 for the tape reels 6 and 7. The cords are guided over rolls 30 and 31, which are mounted on an extension of the central portion of the chassis (not shown in the drawing), to a single central counterweight 32 which is connected to the chassis of the tape transport apparatus by suitable tensioning means 33, e.g. a spring or an elastic band.

In the embodiments shown in FIGS. 3 and 4 it is necessary—in view of the movements of the cords which occur due to the fact that the distance between the axes of the tape reels is continuously changing as the diameters of the tape reels change during the tape transport operation—that the cords should be guided to the counterweight at an angle $\alpha$. To ensure that the effective force component for compensating impacts does not become too small as a result of the choice of angle $\alpha$, the geometric parameters should be so chosen that $\cos \alpha$ does not exceed the leverage ratio obtained by the difference in the lengths of the lever arms.

The counterweight may for example be of elongate shape or have rigid arms 34 to the ends of which cords 9 and 10 are fastened. The arms may also be in the form of springs, so that spring 8 can be dispensed with. The accelerative force of the counterweight 32 acting on cords 9 and 10 when the transport apparatus is subjected to shock counteracts the movement of the tape reels, caused by the impact, through the turnaround of the cords at rolls 30 and 31, so that pressural contact between the tape reels and capstan 11 is maintained. The abovementioned angle $\alpha$ has to be taken into account when determining the mass of the counterweight 32, the mass being calculated from the said lever arm ratio and the masses of the tape reels and supports as in the case of the above-described embodiments, but multiplied by $\cos \alpha$.

In a variant of the foregoing embodiment, shown in FIG. 4, the rolls 30 and 31 are rotatably mounted on the extensions 2' and 3' of the supports 2 and 3. This arrangement, like that shown in FIG. 2, has the advantage that cords 9 and 10 can be guided to the counterweight in the direction in which the tape transport apparatus is particularly sensitive to shock.

In the normal, i.e. shock- and vibration-free, state of operation of the tape transport apparatus according to the invention, the movements of the supports 2 and 3, as the tape is transferred from one reel to the other, are extremely slow, so that the counterweights do not come into action.

It will be understood by those skilled in the art that other embodiments are possible within the framework of the invention, the design of which embodiments should be adapted to suit the particular application. However, these embodiments will be based on the features essential to the invention which have been disclosed above. For example, the compensating force produced by an impact can be further increased by arranging the cords and rolls in such a way that they operate like a tackle.

EXAMPLE

An impact having an acceleration b of 40 g acts on the tape transport apparatus of FIG. 1 in the direction in which the bearings of tape reels 6 and 7 and capstan 11 are aligned. The mean mass m of a support together with a tape reel is 60 g.

The length of each support 2, 3 between its pivot point on the chassis 1 and the center of rotation of the tape reel is $l_1 = 3$ cm, and the length of each support plus extension between the pivot point and the point at which the cord acts on the extension is $l_2 = 6$ cm. The mass of each counterweight 19,20 is calculated as follows:

$K_B = m_B \times b$
$K_G = m_G b$
$l_1 \times K_B = l_2 \times K_G'$
$K_G' = K_G \times \cos \beta$ For an angle of 10° it therefore follows:

$$m_G = \frac{l_1 \times m_B}{l_2 \times \cos \beta} = 31.7 \text{ g}$$

K = force
Indices: B = tape reel; G = counterweight.

A rate C according to DIN 2097 of about $10^{-5}$ kg/mm is chosen for spring 8, the maximum compressive force at the capstan being 700 g.

We claim:

1. A tape transport appratus comprising two tape reels between which a tape can be wound to and fro; a drive capstan arranged between the tape reels; movably mounted supports on which the tape reels are rotatably mounted; biasing means, acting on the supports, for bringing the peripheries of the tape reels into contact with the periphery of the drive capstan; and at least one movable counterweighting means, which is arranged in series with said biasing means, said at least one counterweighting means and said supports being connected together by flexible connecting means guided over rolls so that the mass inertias of said supports together with the tape reels and of the counterweighting means cancel each other out.

2. A tape transport apparatus as claimed in claim 1, wherein the flexible connecting means are in the form of cords.

3. A tape transport apparatus as claimed in claim 2, wherein the cords are attached to extensions of the supports.

4. A tape transport apparatus comprising two tape reels between which a tape can be wound to and fro; a drive capstan arranged between the tape reels; movably mounted supports on which the tape reels are rotatably mounted; biasing means, acting on the supports, for bringing the peripheries of the tape reels into contact with the periphery of the drive capstan; and a counterweighting means which is provided for each support, and the two counterweighting means being connected together by the biasing means, and said two counterweighting means and said supports being connected together by flexible connecting means guided over rolls so that the mass inertias of said supports together with the tape reels and of the counterweighting means cancel each other out.

5. A tape transport apparatus as claimed in claim 4, wherein the flexible connecting means are in the form of cords.

6. A tape transport apparatus as claimed in claim 5, wherein extensions are provided on the supports and wherein the cords are attached to said extensions.

7. A tape transport apparatus comprising two tape reels between which a tape can be wound to and fro; a drive capstan arranged between the tape reels; movably mounted supports on which the tape reels are rotatably mounted; extensions on said movably mounted supports; biasing means, connected to said extensions and thereby acting on the supports, for bringing the peripheries of the tape reels into contact with the periphery of the drive capstan; two counterweighting means directly connected by said biasing means; low-friction guide means; and connecting means connecting said counterweighting means via said low-friction guide means to said extensions so that the mass inertias of said supports together with the tape reels and of the counterweighting means cancel each other out.

* * * * *

UNITED STATES PATENT AND TRADEMARK OFFICE
CERTIFICATE OF CORRECTION

PATENT NO. : 4,424,941
DATED : JAN. 10, 1984
INVENTOR(S) : SCHOETTLE ET AL

It is certified that error appears in the above-identified patent and that said Letters Patent are hereby corrected as shown below:

Title page, after "[22]" insert

-- [30] Foreign Application Priority Data
May 7, 1980 [DE] Fed. Rep. of Germany
..... 3017420 --

Col. 5, line 42, claim 1, "appratus" should be -- apparatus --

Signed and Sealed this

Twenty-second Day of May 1984

[SEAL]

Attest:

GERALD J. MOSSINGHOFF

Attesting Officer

Commissioner of Patents and Trademarks